(12) United States Patent
Nooli et al.

(10) Patent No.: US 10,535,214 B2
(45) Date of Patent: Jan. 14, 2020

(54) COMPACT VENDING MACHINE

(71) Applicant: PepsiCo, Inc., Purchase, NY (US)

(72) Inventors: Praveen Nooli, Coram, NY (US);
Emad Jafa, Brewster, NY (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 15/986,321

(22) Filed: May 22, 2018

(65) Prior Publication Data

US 2019/0362582 A1    Nov. 28, 2019

(51) Int. Cl.
*G07F 7/02* (2006.01)
*G06Q 10/08* (2012.01)
*G06Q 20/18* (2012.01)

(52) U.S. Cl.
CPC .......... *G07F 7/025* (2013.01); *G06Q 10/087* (2013.01); *G06Q 20/18* (2013.01)

(58) Field of Classification Search
CPC .................................................... G07F 11/002
See application file for complete search history.

(56) References Cited

U.S. PATENT DOCUMENTS

| | | | |
|---|---|---|---|
| 5,553,736 A * | 9/1996 | Healis | G07F 11/42 221/101 |
| 5,943,241 A * | 8/1999 | Nichols | G06Q 20/202 221/2 |
| 6,386,389 B1 * | 5/2002 | Percy | G07F 9/02 221/155 |
| 7,455,223 B1 * | 11/2008 | Wilson | G06Q 20/18 221/9 |
| 9,589,411 B2 | 3/2017 | Shimmerlik et al. | |
| 9,589,412 B2 | 3/2017 | Shimmerlik et al. | |
| 9,943,176 B2 * | 4/2018 | Oakes | B65D 75/42 |
| 2009/0039101 A1 * | 2/2009 | Alcov | G06Q 10/06 221/155 |
| 2014/0172159 A1 * | 6/2014 | Unmussig | G07F 7/06 700/232 |
| 2015/0102051 A1 * | 4/2015 | Shimmerlik | B60P 3/0257 221/92 |

* cited by examiner

*Primary Examiner* — Jacob S. Scott
*Assistant Examiner* — Ayodeji T Ojofeitimi
(74) *Attorney, Agent, or Firm* — Sterne, Kessler, Goldstein & Fox, P.L.L.C.

(57) ABSTRACT

A compact vending machine for dispensing food products is disclosed. The compact vending machine includes a lightweight housing which may be mounted on a wall and a payment system that is configured to accept non-cash payments. A power source of the compact vending machine may be an external powers source, such as a power outlet, or an internal battery. An embodiment of the compact vending machine includes a controller and a communication system that are configured to transmit status information about the compact vending machine to a network.

17 Claims, 8 Drawing Sheets

COMPACT VENDING MACHINE

FIELD

The described embodiments generally relate to systems and methods for dispensing food products from a vending machine.

BACKGROUND

Vending machines are used to dispense food products to consumers in an automated fashion. A typical vending machine can contain a combination of beverages, such as soda, juice, or water, and food products, such as nuts, snack mix, and candy bars. Vending machines are typically designed as large, freestanding machines and are usually placed in areas that are frequented by potential consumers.

BRIEF SUMMARY

An embodiment of the present invention is a compact vending machine that includes a housing. The housing includes a back wall that has a mounting system configured to allow the housing to mount to a support structure. A first side wall and a second side wall are attached to the back wall in a parallel orientation to each other, and a bottom wall is attached to the back wall in a perpendicular orientation to the side walls. A front cover is hingedly attached to the bottom wall. The front cover is configured to swing in an outward manner with respect to the back wall. A product storage cartridge configured to dispense a food product is removably located in the housing in such a manner as to be accessible when the front cover is hinged open. The compact vending machine has a payment system located in the housing that is configured to accept non-cash payments from a user and a power source located in the housing that is configured to power the compact vending machine. An input device configured to accept a user input is located on the front cover.

BRIEF DESCRIPTION OF THE FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Vending machines are devices designed to automatically dispense products, including consumable products, such as soda or candy bars, to a consumer without the need for a salesperson to be present. These machines are configured to securely store the food products and dispense a selected product once payment for the product has been processed. A typical vending machine has a large, rectangular housing that stores the food products and contains the necessary input and payment systems. These machines are usually about six feet tall and approximately three feet in width and depth. They weigh several hundred pounds even when empty.

Ideally, vending machines are located as close to potential consumers as possible in order to add convenience to the purchasing process and to take advantage of impulse-buying. However, in busy areas with high levels of foot traffic it is often difficult or impossible to position a conventional vending machine close to the flow of people because of the size of the machine. An example of this problem is found in busy school or office hallways. A typical hallway does not have enough space to hold a three foot deep vending machine and allow enough space for the flow of foot traffic. As a result, either a section of the hallway must be widened, which requires significant work depending on the building, or the vending machine must be placed in a different area that is further away from the foot traffic. Neither of these options is ideal, and as a result potential sales at the vending machine are lost. Embodiments described herein are directed to a compact vending machine that allows for more convenient and successful positioning than conventional vending machines.

Figure 1:
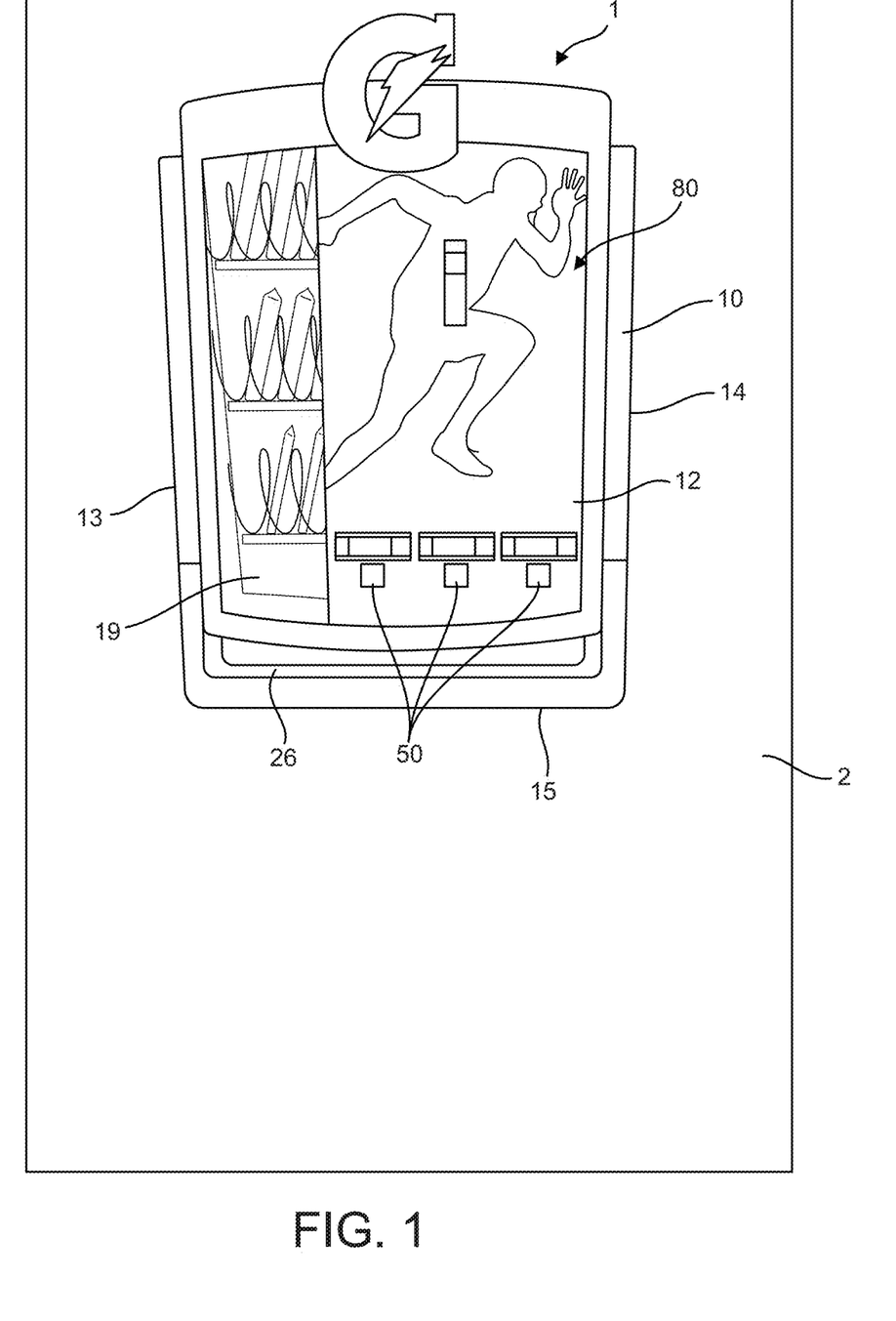
FIG. 1 is a front view of a compact vending machine according to embodiments.
Figure 2:
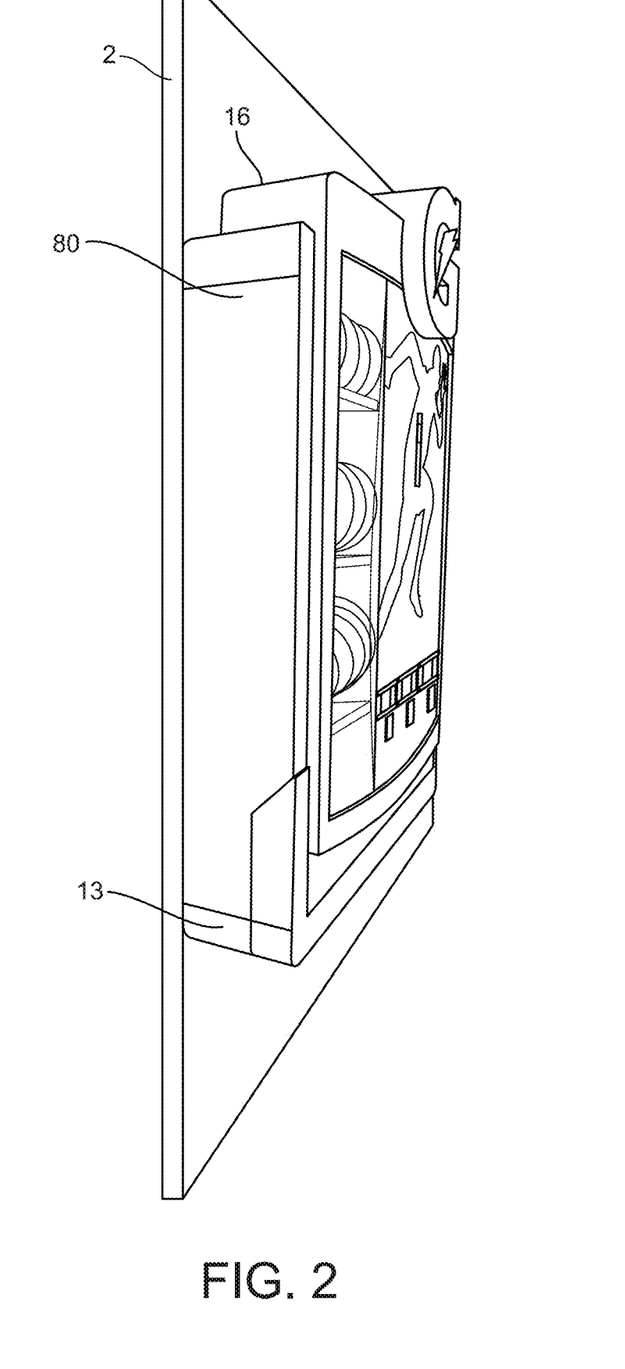
FIG. 2 is a side view of a compact vending machine according to embodiments.

With reference to FIG. 1, an embodiment of a compact vending machine 1 includes a housing 10. Housing 10 includes a back wall 11, a first side wall 13 attached to back wall 11, a second side wall 14 attached to back wall 11 in a parallel orientation to first side wall 13, and a top wall 16 attached to back wall 11 in a perpendicular orientation to first wall 13 and second wall 14. A bottom wall 15 is attached to back wall 11 in a parallel orientation to top wall 16 and a front cover 12 is hingedly attached to bottom wall 15, wherein front cover 12 is configured to swing in an outward manner with respect to back wall 11. A product storage cartridge 20 configured to dispense a food product 22 is removably located in housing 10 in such a manner as to be accessible when front cover 12 is hinged open. Compact vending machine 1 has a payment system 30 located in housing 10 that is configured to accept non-cash payments from a user and a power source 40 located in housing 10 that is configured to power compact vending machine 1. An input device 50 configured to accept a user input is located on front cover 12. In an embodiment, compact vending machine 1 is designed such that housing 10 extends no more than eight inches in depth, which is the direction perpendicular to the plane of back wall 11. Thus, compact vending machine 1 can be mounted on a wall in a high traffic area because it is not so large that it would obstruct traffic. The ability to be mounted on a wall also allows compact vending machine 1 to be placed in many different locations to ensure maximum coverage of potential purchasers.

In an embodiment of compact vending machine 1, housing 10 is constructed as a rectangular box with six walls. Five of the walls are rigidly attached to form a box with one open side: back wall 11, first side wall 13, second side wall 14, bottom wall 15, and top wall 16. These walls can be attached together in any suitable manner, including welding, mechanical fastening through screws, or the use of adhesives. Alternatively, these five walls may made from one continuous piece of metal and bent into place. All of the walls of housing 10 may be made from any appropriate material that possesses sufficient strength and is not excessively heavy. For example, the walls may be made of aluminum, stainless steel, composite materials, or plastic materials, or a combination of any of these materials.

Figure 3:
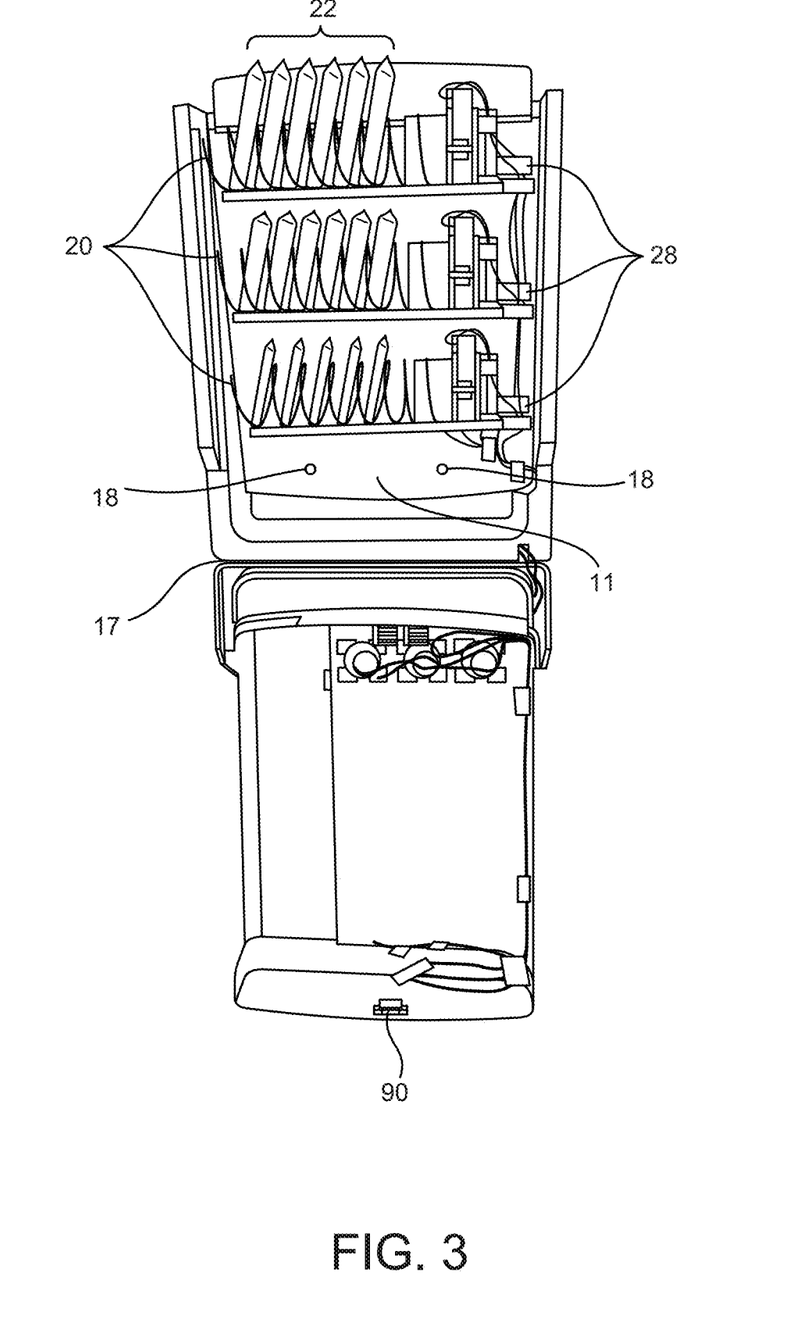
FIG. 3 is a front view of a compact vending machine according to embodiments.

The final side of housing 10, front cover 12, is attached through the use of a front cover hinge 17. In an embodiment, front cover hinge 17 attaches front cover 12 to bottom wall 15. Front cover 12 can then hinge open and closed in a vertical direction, with front cover 12 resting below compact vending machine 1 when it is fully open, as shown in FIG. 3. Front cover 12 may also be hinged at any of the other walls that form housing 10. For example, front cover hinge 17 may be located on first side wall 13 or second side wall 14, and front cover 12 would then hinge open and closed in the same way a book is opened and closed. A front cover lock 90 is located on the wall opposite front cover hinge 17. Front cover lock 90 acts to secure front cover 12 in the closed position. Front cover lock 90 may be any appropriate device configured to keep a hinged panel shut, such as a latch, screw fastener, or friction fitting section between front cover 12 and the wall on which front cover lock 90 is located. In an embodiment, front cover lock 90 includes a locking mechanism which requires a key or special tool to open.

Compact vending machine 1 is configured to be compact and lightweight. In an embodiment, housing 10 is not more than about six inches in depth, which is a measurement taken from front cover 12 to back wall 11 in a direction perpendicular to the plane defined by either of those two walls. The height and width of compact vending machine 1 are also no larger than necessary. Preferably, compact vending machine 1 is no more than about four feet in height and about three feet in width. Compact vending machine 1 is also configured to be as light as possible to facilitate portability and ease of wall mounting. In some embodiments, compact vending machine 1 is light enough to be mounted on standard drywall without needing to be mounted to wall studs or requiring special reinforcement of the drywall. In these embodiments, compact vending machine 1 does not require any support from a floor or other horizontal surface. For example, in an embodiment compact vending machine 1 weighs no more than thirty pounds in an unloaded state—without any food product 22.

In some embodiments, compact vending machine 1 includes a mounting system 18. Mounting system 18 may be located on back wall 11. Mounting system 18 is configured to allow compact vending machine 1 to be mounted to a support structure 2, such as a wall or another similar vertical surface. Mounting system 18 may be any suitable system configured to mount objects to a wall. For example, in one embodiment, mounting system 18 may be a series of holes in back wall 11 that are sized to accept standard bolt or screw fasteners. The holes of this embodiment of mounting system 18 may be configured to be accessible when opening front cover 12. In another embodiment, mounting system 18 may be a mounting bracket that is fixed to the exterior surface of back wall 11. The mounting bracket may be configured to mate with a matching bracket that is fixed to a wall or other surface using commonly known bracket designs, such as a dovetail bracket design. The mounting system 18 allows for rapid attachment of compact vending machine 1 to a wall or other surface. A locking device, such as a pin or a set of holes on the brackets through which the shackle of a lock may be passed, may be incorporated into this embodiment of mounting system 18 to prevent unauthorized removal of compact vending machine 1 from its location. In some embodiments, all or a portion of mounting system 18 may be integral with housing 10. In some embodiments, all or a portion of mounting system 18 may be integral with back wall 11.

Figure 4:
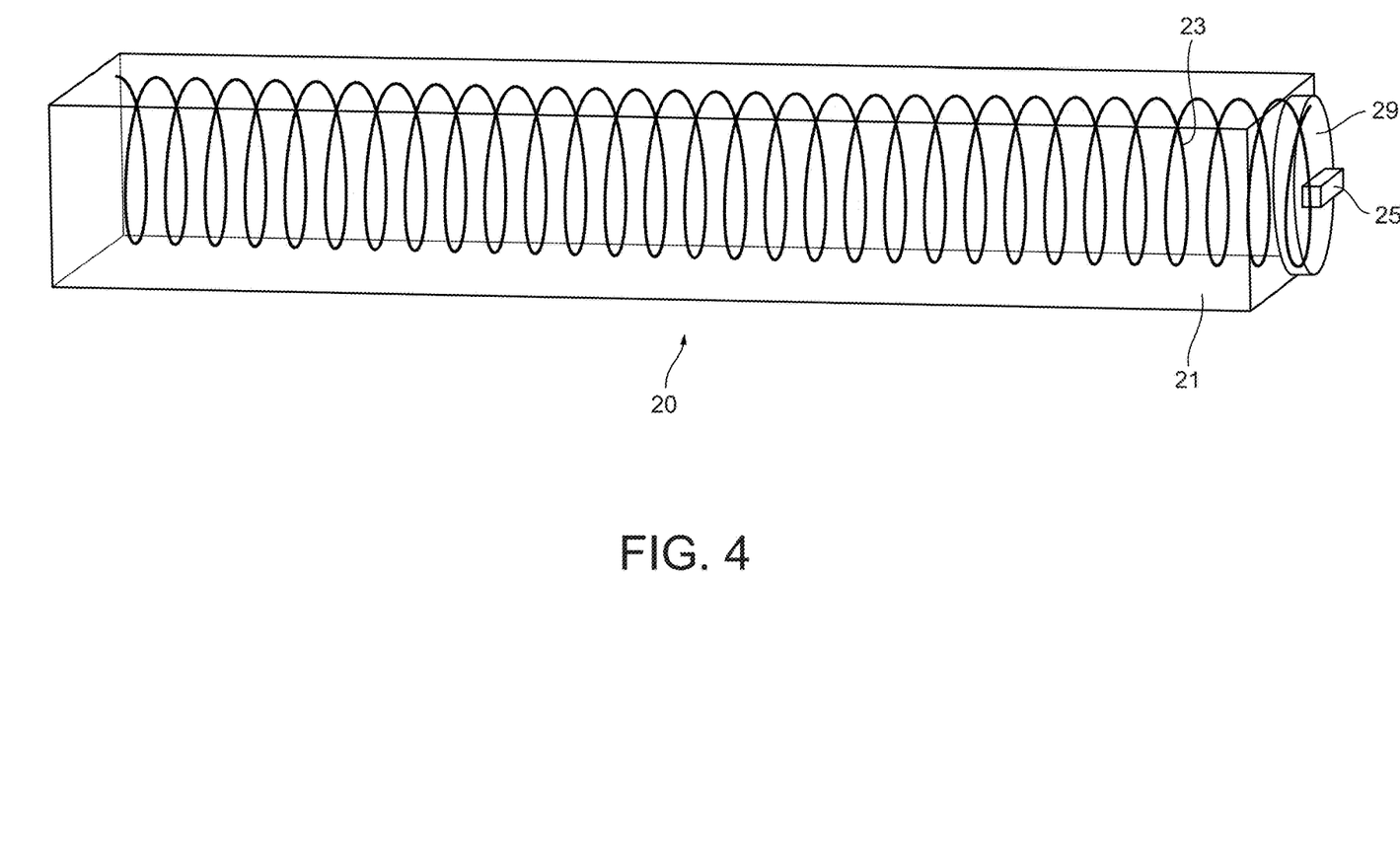
FIG. 4 is a schematic view of a product storage cartridge according to embodiments.

Product storage cartridge 20 is a cartridge configured to store and dispense food products 22 on demand. Housing 10 includes a cartridge adaptor 24 that is configured to hold product storage cartridge 20 in a releasable or removable manner. In some embodiments there may be two or more cartridge adaptors 24 located in housing to receive two or more product storage cartridges 20. Once front cover 12 is hinged open, product storage cartridge 20 can be released from cartridge adaptor 24 and a new product storage cartridge 20 can be placed into cartridge adaptor 24. Product storage cartridge can be filled with food product 22. Food product 22 may be beverages, like soda, juice, or water, or solid food, such as snack mix, nuts, or candy bars.

Product storage cartridge 20 is configured to store food product 22 and dispense a single piece of food product 22 after a user has made a purchase. There are several mechanisms that may be used to dispense food product 22 from product storage cartridge 20. In one embodiment, product storage cartridge 20 includes a "spiral" or "coil" type system, where product storage cartridge 20 includes a coil 23 of stiff wire that runs the length of product storage cartridge 20. Food product 22 is loaded into the winds of coil 23 inside product storage cartridge 20. A cartridge housing 21 of product storage cartridge 20 contains coil 23 and food product 22. To dispense a single piece of food product 22, a cartridge actuator 28 coupled to coil 23 turns the winds of coil 23 a predetermined number of degrees. This acts to "advance" the pieces of food product 22 in the coil 23, and the piece of food product 22 at the end of coil 23 is pushed out of the end of product storage cartridge 20. Cartridge actuator 28 may be any suitable means of actuating product storage cartridge 20, including, for example, an electric motor, servo motor, or stepper motor.

In another embodiment, product storage cartridge 20 is mounted vertically and food product 22 is stacked inside product storage cartridge 20. A latch or door blocks the bottom of product storage cartridge 20, and cartridge actuator 28 is connected to the latch or door. Cartridge actuator 28 can open the latch or door to allow a piece of food product 22 to be dispensed. In some embodiments, a dispensing chute 26 may be configured to catch the piece of food product 22 as it departs product storage cartridge 20 and allow the piece of food product 22 to be retrieved by the user. In any embodiments of compact vending machine 1, the bottom portion of housing 10 may be shaped such that it is curved away from the wall. This allows dispensing chute 26 to be oriented at an angle of less than ninety degrees with the horizontal plane, which may provide a more aesthetically pleasing presentation of dispensed food product 22 to a user.

Figure 5:
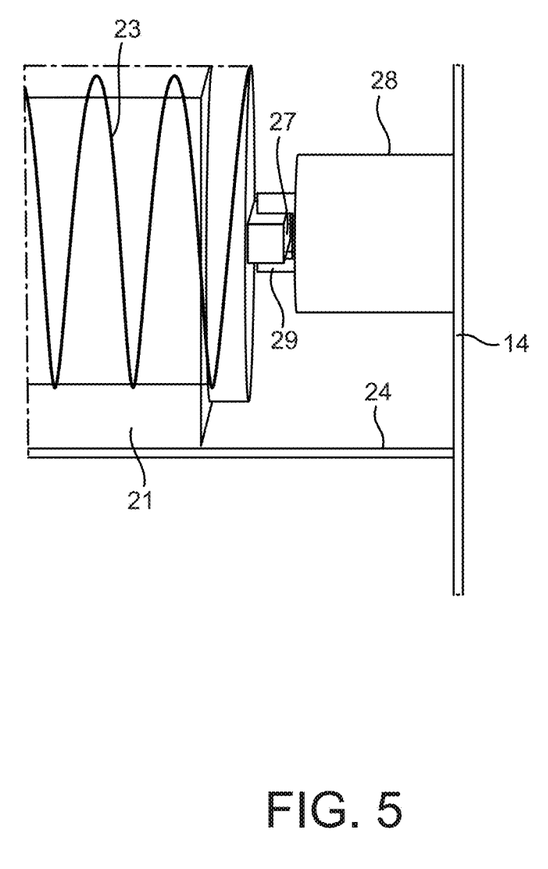
FIG. 5 is a detail view of a product storage cartridge according to embodiments.

In some embodiments, cartridge actuator 28 is mounted to an interior surface of housing 10. As shown in FIG. 5 cartridge actuator 28 can include an actuator adaptor 29 that interfaces with product storage cartridge 20 to allow cartridge actuator 28 to control the dispensing of food product 22 from product storage cartridge 20. Actuator adaptor 29 may include a rectangular protrusion 25 on product storage cartridge 20 that mates with a rectangular recess 27 attached to cartridge actuator 28. Protrusion 25 and recess 27 may also be formed in other shapes, such as semi-circles and triangles. The protrusion/recess relationship may also be reversed, with protrusion 25 being attached to cartridge actuator 28 and recess 27 being located on product storage cartridge 20. Embodiments of compact vending machine 1 allow product storage cartridge 20 to be simplified because there is no need to include an actuator and the supporting circuitry in product storage cartridge 20. This in turn reduces the cost of pre-loading large numbers of product storage cartridges 20 by shifting the more expensive actuation components and circuitry to compact vending machine 1.

Product storage cartridge 20 may be configured to allow for easy replacement of food product 22. For example, in some embodiments one of the sides of housing 21 of product storage cartridge 20 may include a hinged attachment to one of the other sides of housing 21. The hinged side can be swung open, allowing access to the interior of housing 21. One or more sides of housing 21 may also be removable, and accordingly allow access to the interior of housing 21. In other embodiments, actuator adaptor 29 and the internal dispensing mechanism, such as coil 23, may be removable from housing 21. Individual pieces of food product 22 may then be loaded into the winds of coil 23 after it is removed from housing 21.

An embodiment of product storage cartridge 20 may be configured to contain only food product 22 that is a certain form factor. For example, product storage cartridge 20 may only be configured to accept candy bar shaped items that are rectangular and are no larger than a certain size. This allows the winds of coil 23 or the spacing of a gravity type dispenser to be made as dense as possible because there is no need to accommodate larger pieces of food product 22 in the same product storage cartridge. This in turn allows a designer to maximize the density of food product 22 in product storage cartridge 20, which in turn maximizes the storage of food product in compact vending machine 1 without increasing the volume of housing 10.

Figure 6:
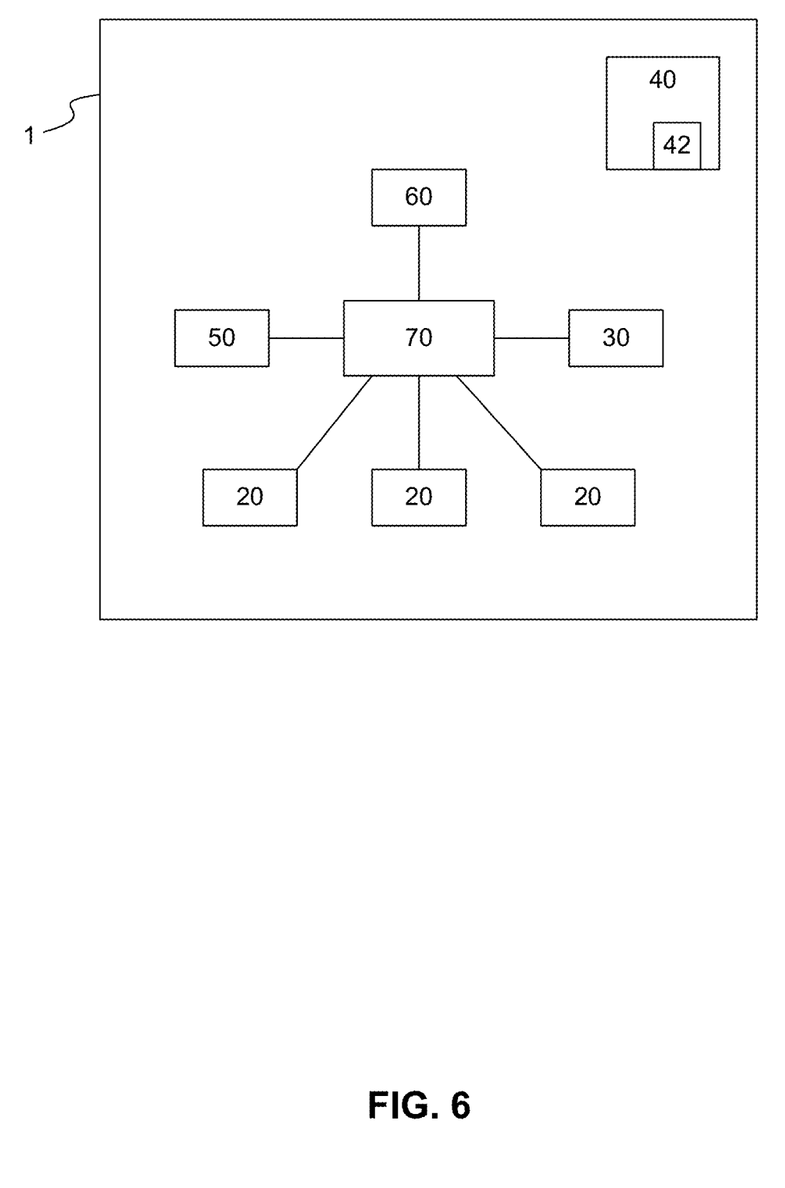
FIG. 6 is a schematic block diagram of a compact vending machine according to embodiments.

Power source 40 is configured to provide power to the various components of compact vending machine 1. Power source 40 may include a power cord that extends outside of housing 10 that is adapted to plug into a standard wall outlet. Some embodiments of power source 40 include power conversion circuitry to provide the appropriate electrical power to compact vending machine 1. An embodiment of power source 40 includes a battery 42. Battery 42 is configured to power compact vending machine 1 when external power is not available. Battery 42 may be sized to provide an extended period of power to compact vending machine 1, for example a period of three or more days in normal operation. Power source 40 may include circuitry that can charge battery 42 when external power is present. In an embodiment, battery 42 may be easily accessible and "hot" swappable once front cover 12 is opened. The phrase "hot swappable" refers to a design which allows battery 42 to be easily removed and replaced without negatively affecting the operation of compact vending machine 1 after replacement (i.e. by damaging the components due to the loss of power). Any appropriate design for battery replacement may be used. For example, a design similar to the one found in a handheld power drill may be used to enable the quick removal and replacement of battery 42.

The power requirements of compact vending machine 1 are preferably minimized to allow for longer operation on battery power. As an example, any lighting used in housing 10 may consist of light emitting diodes ("LEDs") that use less power than ordinary incandescent lighting. Some embodiments of compact vending machine 1 may also be designed without a cooling system. A cooling system takes a significant amount of energy and would result in a much shorter battery life. Accordingly, an embodiment of compact vending machine 1 does not include a cooling system and would only be able to maintain ambient temperature inside housing 10.

Compact vending machine 1 includes payment system 30 to accept payment from users for dispensing a piece of food product 22. In an embodiment, payment system 30 is configured to only accept non-cash payment. Examples of such payment methods might include credit cards, debit cards, and electronic transfer of funds via various applications and programs. Payment system 30 can include a payment reader 32. For example, payment reader 32 might be a magnetic stripe reader for card payments, a transceiver to communicate with smart devices, or a barcode reader. In an embodiment, a user might download an application configured to interface with payment system 30 to their smart device, such as a phone or tablet, and place and pay for their order using the application. Payment system 30 may either scan a barcode displayed on the smart device or communicate with the application to determine which food product 22 to dispense and to confirm that the user has submitted payment.

Figure 7:
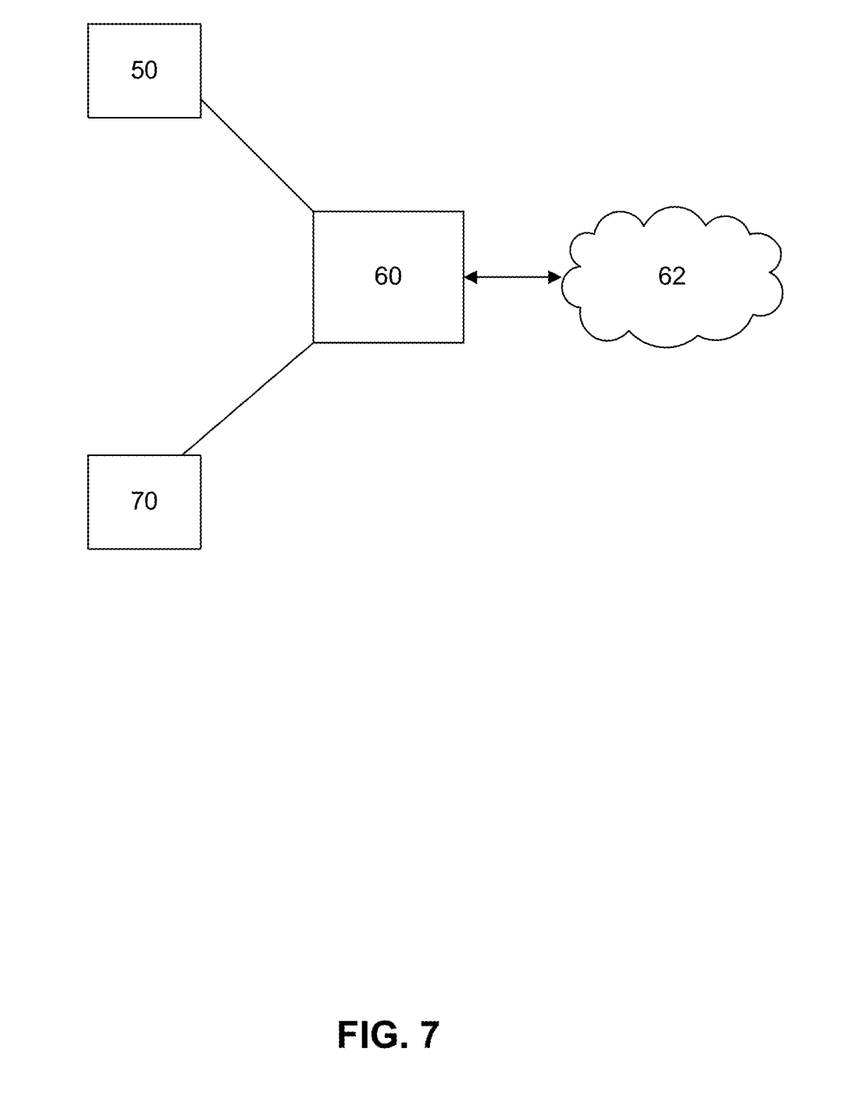
FIG. 7 is a schematic block diagram of a communication system of a compact vending machine according to embodiments.

In an embodiment, payment system 30 can communicate with a communication system 60 that is included in compact vending machine 1. Communication system 60 includes a transceiver that is configured to communicate with network 62. Network 62 may be a cellular data network, WiFi network, or other type of network. Payment system 30 may use communication system 60 to transmit and receive payment details and payment confirmation to and from network 62.

Compact vending machine 1 includes input device 50 that is configured to enable a user to select a type of food product 22 to purchase. In an embodiment, input device 50 can be a series of buttons located on front cover 12. Each button can be used to select a certain food product 22 for purchase. In another embodiment, input device 50 may be a touchscreen that is located on front cover 12. A user can use the touchscreen to purchase their preferred food product 22. The touchscreen embodiment of input device 50 may be combined with payment system 30 to facilitate the purchasing experience. Any of the embodiments of input device 50 may be linked to communication system 60 or include a separate transceiver that can communicate with an application on a user's smart device in order to allow a user to make a purchase using their smart device.

Embodiments of compact vending machine 1 include a controller 70. Controller 70 can be a microprocessor or other similar device. Controller 70 may monitor various status information and perform certain tasks. For example, controller 70 may monitor the quantity of food product 22 in product storage cartridge 20 by tracking the quantity of dispensed food product 22. Controller 70 may also monitor a charge state of battery 42. And controller 70 can be programmed to monitor the operation status of other systems and components of compact vending machine 1, such as payment system 30 and communication system 60. Controller 70 may be configured to use communication system 60 to transmit some or all of this information to network 62. In an embodiment, controller 70 is programmed to transmit an alert to network 62 when either the quantity of food product 22 gets to a preprogrammed low point or when the charge state of battery 42 reaches a certain discharge state. Controller 70 may also be programmed to transmit an alert to network 62 if an error condition occurs, such as, for example, if payment system 30 malfunctions. In some embodiments, instructions may be transmitted from a remote user to compact vending machine 1 through network 62 and communication system 60. Instructions may include, for example, diagnostic inquiries, vending instructions, and troubleshooting commands. Any or all components of compact vending machine 1 may be remotely controlled through communication system 60. For example, compact vending machine 1 may be prevented from vending any food products 22 (for example, during a predetermined time range) through use of a remote instruction transmitted to communication system 60.

Vending machines often include advertising or branding to attract potential customers. An embodiment of compact vending machine 1 includes advertising 80 located on at least one of the exterior surfaces of housing 10. Advertising 80 may include logos, graphics, words, or other items configured to represent the brands of food product 22 that are sold by compact vending machine 1. An embodiment of housing 10 includes a transparent portion 19 located in front cover 12. Transparent portion 19 is configured to allow a user to see through part of front cover 12 and examine food product 22 that is stored inside housing 10. Because food product 22 is typically stored in branded containers or packaging, this enhances the advertising and branding experienced by the user. In an embodiment, advertising 80 is configured to be quickly exchanged for other types of advertising. For example, advertising 80 may take the form of logos and words on pieces of glossy paper. Housing 10 may include clear plastic sleeves integrated into the outside surface of each exterior wall that allows the paper sheets to be mounted and made visible to users of compact vending machine 1. The paper sheets are easily swapped with other paper sheets, for example if a different food product 22 is used in compact vending machine 1. In a further embodiment, advertising may be displayed on a screen that is mounted to front cover 12.

An additional means of advertising may come through the use of communication system 60. Controller 70 may be programmed with advertising that can be transmitted to network 62 via communication system 60. Such advertising can then be sent to users with the appropriate application that are located nearby compact vending machine 1. In particular, users that have indicated a preference for a certain brand of food product 22, such as on a social media platform or similar public forum, may be notified that their preferred brand of food product 22 is located in a nearby compact vending machine 1.

The compact size and capacity of compact vending machine 1 also allows for the economic use of a single brand of food product 22 in compact vending machine 1. This allows for specific targeting of certain locations with specific foods that can enhance the user experience. For example, if compact vending machine 1 is placed in a location with a potential customer base that enjoys candy and similar sweets, compact vending machine 1 may be filled with those types of food products 22 and advertising 80 can be easily changed to reflect that change. If compact vending machine 1 is moved to a location with a potential customer base that enjoys healthy snacks, such as mixed nuts, compact vending machine 1 can be easily reloaded with those types of food products 22 and advertising 80 can be changed again. The light weight of compact vending machine 1 simplifies the transfer between locations, and the design of housing 10 enables the easy change of both food product 22 and advertising 80.

Figure 8:
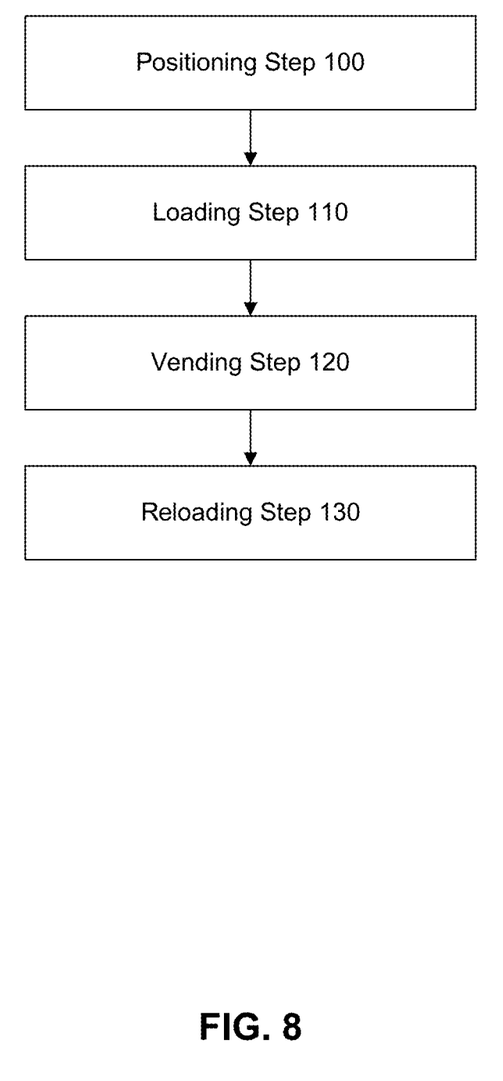
FIG. 8 is a flow diagram of a method of using a compact vending machine according to embodiments.

A method for using an embodiment of compact vending machine 1 is as follows. In a positioning step 100, compact vending machine 1 is mounted in an appropriate area. Such an area might be a hallway of a school or office or at "pop up" location such as a concert, festival, or other gathering. The lightweight and compact design of compact vending machine 1 make it easy to position it in these venues. Compact vending machine 1 may be mounted to an appropriate wall using mounting system 18. In a loading step 110, compact vending machine 1 is provided with product storage cartridges 20 that are pre-filled with food product 22. Alternatively, individual pieces of food product 22 may be loaded into product storage cartridge 20. Individual loading may be desirable, for example, depending on the amount of food product 22 already present in product storage cartridge 20. Also at this time, compact vending machine 1 is connected to external power, if available, and charged battery 42 is loaded into housing 10 if necessary. Compact vending machine 1 is then powered on and otherwise prepared for use. In a vending step 120, compact vending machine 1 distributes food product 22 to users. Users may use their choice of available non-cash payment, including a credit card, debit card, or other electronic payment. In some embodiments, users may order and purchase their preferred food product 22 through an application on their smart device. After a user has paid for food product 22, actuator 28 is engaged to dispense food product 22. In embodiments of compact vending machine 1 that include a coil-type product cartridge 20, actuator 28 rotates actuator adaptor 29 a set number of degrees, which in turn rotates coil 23 the same number of degrees. The winds of coil 23 advance and move a piece of food product 22 to the end of the winds of coil 23. The piece of food product 22 then falls out of the end of product cartridge 20 and is available to be retrieved by the user at the lower portion of compact vending machine 1.

If available, controller 70 monitors the quantity of food product 22 and charge status of battery 42. An alert is sent to network 62 if either of these levels fall too low, or if another error occurs. In a reloading step 130, a service technician replaces depleted product storage cartridges 20 with fresh product storage cartridges 20. Depleted battery 42 may also be replaced with charged battery 42. The type of food product 22 that is chosen to be reloaded may be tailored based on the usage patterns recorded by controller 70 and transmitted to network 62.

The breadth and scope of the present disclosure should not be limited by any of the above-described exemplary embodiments, but should be defined only in accordance with the following claims and their equivalents.

What is claimed is:

1. A compact vending machine, comprising:
   a housing, comprising:
     a back wall comprising a mounting system configured to allow the housing to mount to a support structure;
     a first side wall attached to the back wall;
     a second sidewall attached to the back wall in a parallel orientation to the first side wall;
     a bottom wall attached to the back wall in a perpendicular orientation to the first and second side walls; and
     a front cover hingedly attached to the bottom wall, wherein the front cover is configured to swing in an outward manner with respect to the back wall;
   a product storage cartridge removably disposed in the housing so as to be accessible when the front cover is hinged open, wherein the product storage cartridge is configured to dispense a food product;
   a cartridge actuator disposed in the housing configured to dispense the food product from the product storage cartridge;
   a payment system disposed in the housing configured to accept non-cash payments from a user;
   a power source comprising a battery disposed in the housing configured to power the entire vending machine without relying on other power inputs; and
   an input device disposed on the front cover configured to accept a user input,
   wherein the cartridge actuator is fixed to the housing and is releasably coupled to the product storage cartridge when the product storage cartridge is disposed in the housing.

2. The vending machine of claim 1, wherein the power source further comprises charging circuitry that charges the battery when the power source is connected to an external power source.

3. The vending machine of claim 1, wherein the power source is configured to power the vending machine without external power for a period of three days.

4. The vending machine of claim 1, wherein the front cover further comprises a transparent portion that enables viewing of the food product.

5. The vending machine of claim 1, wherein the vending machine does not include a cooling system.

6. The vending machine of claim 1, wherein the product storage cartridge is configured to accept only solid food products of a form factor and the product storage cartridge is configured to maximize the food products that can be stored through sizing of the product storage cartridge to maximize the packing density of the form factor.

7. The vending machine of claim 1, further comprising a plurality of product storage cartridges.

8. The vending machine of claim 1, wherein the housing does not receive any support from a floor when mounted to the support structure.

9. The vending machine of claim 1, wherein when mounted on the support structure, the housing extends no more than eight inches in a direction perpendicular to the support structure.

10. The vending machine of claim 1, further comprising a communication system that is configured to communicate with a network.

11. The vending machine of claim 10, wherein the payment system communicates with the communication system to process payments.

12. The vending machine of claim 10, further comprising a controller that is configured track a quantity of food product remaining in the vending machine, wherein the controller may transmit the quantity of food product remaining to the network using the communication system.

13. The vending machine of claim 10, wherein a controller is configured to monitor a charge state of the battery and transmit the charge state to the network using the communication system.

14. The vending machine of claim 10, wherein the input device can accept input from a user over the network through the communication system.

15. The vending machine of claim 12, wherein the controller may transmit malfunction messages concerning a status of the vending machine to the network using the communication system.

16. The vending machine of claim 1, wherein the housing is configured to display advertising on an exterior surface of the housing.

17. The vending machine of claim 16, wherein the housing is configured to exchange the advertising displayed on the exterior surface of the housing.

* * * * *